**3,205,120
LAMINATED STRUCTURES**
James C. Flanders, White Plains, N.Y., assignor to Union
 Carbide Corporation, a corporation of New York
No Drawing. Filed Jan. 23, 1962, Ser. No. 168,276
8 Claims. (Cl. 161—160)

The invention relates to laminated structures at least one layer of which comprises a flexible polyurethane foam of the polyether type that is heat sealed to a substrate.

In the preparation of many articles which employ flexible polyurethane foams, it is necessary to form an adhesive bond between the foam and a substrate such as an organic plastic, wood, a fabric, a metal, and the like. One of the most useful methods for adhering a polyurethane foam to a substrate is the heat sealing method. This method comprises heating the surface of the foam to form a layer of tacky liquid, after which the substrate is applied to the fused surface of the foam to form a laminate. When the aforesaid layer of tacky liquid cools and resolidifies, the resulting bond between the polyurethane foam and the substrate is frequently as strong or stronger than the strength of the polyurethane foam itself. Heretofore, the only polyurethane foams which could be laminated in this manner were those of the polyester type. Polyurethane foams of the less expensive polyether type could not be heat sealed for the reason that the fused surface layer of a polyether-type foam would not resolidify.

Conventional flexible polyurethane foams of the polyether type have heretofore been prepared commercially by reacting an organic polyisocyanate with a polyoxyalkylene polyol having a molecular weight of greater than about 2000, and in the usual case, greater than about 3000, and up to about 10,000 or more. In accordance with the present invention, it has been discovered that flexible polyurethane foams of the polyether type that have useful heat sealing properties can be prepared by reacting an organic polyisocyanate with a mixture of hydroxyl-containing compositions wherein said mixture comprises a major amount, based on the weight of said mixture, of a polyoxyalkylene polyol having a molecular weight of greater than about 2000, and a minor amount, based on the weight of said mixture, of a hydroxyl-containing composition having a molecular weight of less than about 1500, the last said composition being fully described hereinbelow. Accordingly, the present invention provides a laminated structure which comprises at least one layer of a flexible polyurethane foam, which is fully described hereinbelow, heat sealed to a substrate.

As used herein, by the term "laminated structure" is meant an article that is prepared by bonding together a plurality of superposed layers of material by the application of pressure, and under the influence of heat.

As used herein, by the term "heat sealed" is meant that relationship between two substances whereby the surface layer of the first substance has been heated to form a layer of liquid, after which the second substance is placed in contact with the said layer of liquid and is kept in contact therewith under at least contact pressure until the said layer of liquid cools and resolidifies to form an adhesive bond between the first said substance and the second said substance.

As used herein, by the expression "flexible polyurethane foam" is meant a pliable foam that is capable of being flexed. When used in this context, the word "flexible" is an expression that has an art-recognized meaning that is readily understood by those having ordinary skill in the art.

The heat sealable flexible polyurethane foams that are employed to prepare the laminated structures of the invention comprise the foamed reaction product of (1) an organic polyisocyanate and (2) a mixture of a major amount of a polyoxyalkylene polyol having an average molecular weight of at least about 2000 and a minor amount of polyol selected from the group consisting of a polyoxyalkylene polyol having an average molecular weight of less than about 1500, a hydroxyaliphatic ester of a phosphorus-containing acid, said ester having an average molecular weight of less than about 1500, and a hydroxyl-containing natural oil having a molecular weight of less than about 1500.

The organic polyisocyanates which are employed to prepare the heat sealable flexible polyurethane foams of the invention include, for example, the arylene diisocyanates such as 2,4- and 2,6-tolylene diisocyanate, naphthalene diisocyanate, di(2-methyl-4-isocyanatophenyl)methane, the xylylene diisocyanates, the phenylene diisocyanates, the bisphenylene diisocyanates, and the like; the arenyl triisocyanates such as 2,4,6-tolenyl triisocyanate, 1,3,5-phenenyl triisocyanate, the naphthenyl triisocyanates, and the like; the aliphatic polyisocyanates such as hexamethylene diisocyanate, ethylene diisocyanate, trimethylene diisocyanate, 1-methyl-2,4-diisocyanatocyclohexane, 1-methyl-2,4,6-triisocyanatocyclohexane, and the like. The preferred organic polyisocyanates are the arylene diisocyanates, and highly preferred are the tolylene diisocyanates.

The polyoxyalkylene polyols having average molecular weights of greater than about 2000, preferably greater than about 2500, and up to 10,000 or more, are the alkylene oxide adducts of compositions which contain a plurality of reactive hydrogen atoms, wherein the reactive hydrogen is determined by the Zerewitinoff method described in J. Am. Chem. Soc., volume 49, page 3181 (1927). The said adducts are prepared by reacting a vicinal epoxide with a composition having at least two Zerewitinoff reactive hydrogen atoms per molecule (said composition being termed in the art a "starter"), according to known methods and in such proportions that the average molecular weight of the resulting polyoxyalkylene polyol is at least about 2000, preferably at least 2500, and up to 10,000 or more.

The said polyoxyalkylene polyols which have molecular weights of at least 2000 can be represented in simplification by Formula I (I)

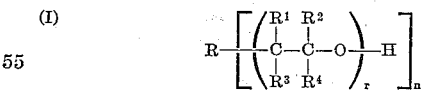

wherein R represents the residue of a compound which contains $n$ reactive hydrogen atoms, wherein the variables $R^1$, $R^2$, $R^3$, and $R^4$ individually represent a hydrogen atom or an alkyl group having from 1 to 6 carbon atoms, wherein $r$ represents a number having a value of at least 1 and such that the average molecular weight of the composition represented by Formula I is at least 2000, preferably at least 2500, and up to 10,000 or more, and wherein $n$ represents a number having a value of from 2 to 6. Illustrative of the variables $R^1$ through $R^4$ are hydrogen, methyl, ethyl, propyl, butyl, pentyl, hexyl, and the like.

The vicinal epoxides employed to prepare the polyoxyalkylene polyols are the epoxyalkanes which preferably have from 2 to 8, and most preferably from 2 to 4, carbon atoms. Illustrative examples include ethylene oxide, 1,2-epoxypropane, 1,2-epoxybutane, 2,3-epoxybutane, 2-methyl-1,2-epoxypropane, the epoxypentanes, the epoxyhexanes, the epoxyheptanes, the epoxyoctanes, mixtures thereof, and the like. Ethylene oxide, 1,2-epoxypropane, and the epoxybutanes are preferred, and 1,2-epoxypropane is highly preferred.

The starter, that is the composition which contains a plurality of reactive hydrogen atoms, can be represented by the formula $RH_n$ wherein H represents a reactive hydrogen, wherein $n$ represents a number having a value of from 2 to 6, and wherein R represents the remainder or the residue of the starter molecule. The starter can be water, a polyhydric alcohol, an amine, ammonia, a polybasic carboxylic acid, an amide, a polyhydric mercaptan, or the like. Water and the alkanepolyols having from 2 to 3 hydroxyl groups and from 2 to 6 carbon atoms are preferred. Illustrative specific examples of compositions which contain a plurality of reactive hydrogen atoms include, among others, water, ammonia, urea, compounds having from 2 to 21 or more carbon atoms, for example, the polyhydric alcohols such as ethylene glycol, 1,2-dihydroxypropane, 1,4-dihydroxybutane and other alkylene glycols, glycerine, 1,5-dihydroxy-3-methylolpentane, 1,2,6-trihydroxyhexane and other trihydroxyalkanes, pentaerythritol, the pentoses, sorbitol, glucose and other hexoses, sucrose, triethanolamine, triisopropanolamine, tributanolamine, N,N,N',N' - tetraethanolethylenediamine, and other alkanolamines, 2,2-bis(p-hydroxyphenyl)propane, 1,1,2-tris(p-hydroxyphenyl)propane, castor oil, resorcinol, the dimethylolbenzenes, 1,4-dihydroxycyclohexane, 1,3,5-trihydroxycyclohexane and other polyhydroxycycloalkanes, and the like. Illustrative amines and polyamines that can be employed as starters include ethylene diamine and other alkylenediamines, diethylenetriamine, ethylamine, propylamine, isopropylamine, the butylamines, the pentylamines, the hexylamines, the heptylamines, the octylamines, and other alkylamines, diethanolamine, diisopropanolamine, ethanolamine and other mono- and dialkanolamines, aniline, the benzenediamines and other aryl mono- and polyamines, cyclohexylamine and other cycloalkylamines, and the like. Additional illustrative compounds that can be employed as starters include oxalic acid, malonic acid, succinic acid, glutaric acid, adipic acid, pimelic acid, suberic acid, azelaic acid, sebacic acid, and other alkanepolycarboxylic acids, cyclohexanedicarboxylic acids, phthalic acid, isophthalic acid, terephthalic acid and other arylpolycarboxylic acids, formamide, acetamide, propionamide, butyramide, adipamide and other alkanemono- and polyamides, 1,2-ethanedithiol, 1,2,3-propanetrithiol, and other polythiolalkanes, and the like.

The formulation for preparing the heat sealable polyurethane foams employed in the invention also includes a polyol having an average molecular weight of less than about 1500, preferably less than about 1000, and most preferably less than about 500, and down to about 200, wherein said polyol can be a polyoxyalkylene polyol, a hydroxyaliphatic ester of a phosphorus-containing acid, a hydroxyl-containing natural oil, or mixtures thereof.

The polyoxyalkylene polyols contemplated are those which can be represented by Formula II (II) 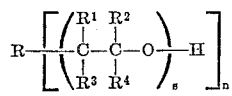

wherein R represents the residue of a compound which contains $n$ reactive hydrogen atoms, wherein the variables $R^1$, $R^2$, $R^3$, and $R^4$ individually represent a hydrogen atom or an alkyl group having from 1 to 6 carbon atoms, wherein $s$ represents a number having a value of at least 1 and such that the average molecular weight of the composition represented by Formula II is less than about 1500 and as low as about 200, and wherein $n$ represents a number having a value of from 2 to 6. The polyoxyalkylene polyols represented by Formula II are structurally the same as those which are represented by Formula I supra, except for the molecular weight. Therefore the discussion of the vicinal epoxides and the reactive hydrogen-containing compositions which are employed to prepare the polyoxyalkylene polyols of Formula I is equally applicable to the polyethers of Formula II. The preferred polyoxyalkylene polyols having molecular weights of less than about 1500 are the epoxyalkane adducts of water and of alkanepolyols wherein said epoxyalkane has from 2 to 4 carbon atoms and wherein said alkanepolyol has from 2 to 3 hydroxyl groups and from 2 to 6 carbon atoms.

The hydroxyaliphatic esters of phosphorus-containing acids having molecular weights of less than about 1500 that are encompassed within the present invention are those compositions which can be represented by Formula III (III) 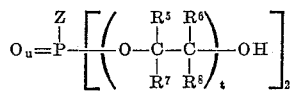

wherein $u$ is an integer having a value of 0 or 1, wherein the variables $R^5$, $R^6$, $R^7$, and $R^8$ individually represent hydrogen, alkyl having from 1 to 6 carbon atoms, or haloalkyl having from 1 to 6 carbon atoms and preferably 1 to 2 halo groups, wherein $t$ is a number having a value of at least 1 and such that the average molecular weight of the composition represented by Formula III is less than about 1500 and as low as about 200, and wherein Z is either hydrogen or a group having the formula

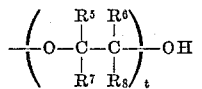

wherein the variable $R^5$, $R^6$, $R^7$, $R^8$, and $t$ have the significance stated above, provided that when Z is hydrogen $u$ is 1. Illustrative of the variables $R^5$ through $R^8$ are, among others, hydrogen, methyl, ethyl, propyl, isopropyl, butyl, pentyl, hexyl, chloromethyl, chloroethyl, chloropropyl, chlorobutyl, chloropentyl, chlorohexyl, bromomethyl, 1,2-dichloroethyl, 1,2-dichloropropyl, 2,3-dibromopropyl, 5,6-dichlorohexyl, and the like.

The preferred class of hydroxyaliphatic esters of phosphorus-containing acids which can be employed are the hydroxyaliphatic phosphites which can be represented by Formula IV (IV) 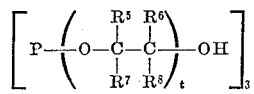

wherein the variables $R^5$, $R^6$, $R^7$, $R^8$, and $t$ have the significance stated above with respect to Formula III. The preparation of the hydroxyaliphatic phosphites can be by known methods. For example, phosphorus trichloride can be reacted with sodium phenate to produce triphenyl phosphite. The triphenyl phosphite can then be subjected to an ester exchange reaction according to known methods with an alkylene glycol or with a dialkylene glycol such as, for example, ethylene glycol to produce tris(hydroxyethyl)phosphite, which is one of the hydroxyaliphatic phosphites contemplated by the invention. Other illustrative hydroxyaliphatic phosphites which can be prepared by procedures analogous to that described above include, for example, tris(diethylene glycol)phosphite, tris(2-hydroxypropyl)phosphite, tris(dipropylene glycol)phosphite, tris(2-hydroxybutyl)phosphite, tris(2-methyl-2-hydroxypropyl)phosphite, the tris(hydroxypentyl)phosphites, the tris(hydroxyhexyl)phosphites, the tris(hydroxyheptyl)phosphites, the tris(hydroxyoctyl)phosphites, and the like. Also contemplated are the hydroxyaliphatic phosphites which can be prepared by condensing an alkylene oxide or an aliphatic haloepoxide with, for example, one of the hydroxyaliphatic phosphites enumerated above, the condensation being carried out in the presence of a basic, Lewis acid, or proton acid catalyst. Included among the alkylene oxides and aliphatic haloepoxides which can be employed are vicinal epoxides such as ethylene oxide, 1,2-epoxypropane, 1,2-epoxybutane, 2,3-epoxybutane, 2-methyl-1,2-epoxypropane, the epoxypentanes, the epoxyhexanes, the epoxyheptanes, the epoxyoctanes, 3-chloro-1,2-epoxypropane, 3-bromo-1,2-epoxypropane, 3-chloro-1,2-epoxybutane, 3,4-dichloro-1,2-epoxybutane, 4-chloro-1,2-epoxypentane, 3,4-dichloro-1,2-epoxyhexane, and the like. The preferred hydroxyaliphatic phosphites are the tris(dialkylene glycol)phosphites wherein the alkylene moieties thereof have from 2 to 4 carbon atoms.

Also included among the hydroxyaliphatic esters of phosphorus-containing acids which can be employed in the invention are the hydroxyaliphatic esters of orthophosphorous acid and of orthophosphoric acid. These esters can be represented by Formula V (V) 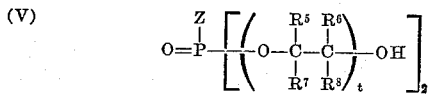

wherein the variables Z, $R^5$, $R^6$, $R^7$, $R^8$, and $t$ have the same significance as stated above with respect to Formula III. The esters represented by Formula V can be prepared by condensing an alkylene oxide or an aliphatic haloepoxide with orthophosphoric acid, that is,

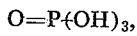

or with orthophosphorous acid, that is,

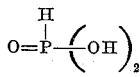

The condensation can be carried out by adding the alkylene oxide or the aliphatic haloepoxide to the acid in such proportions that the molecular weight of the ester produced thereby is between about 200 and 1500. Among the alkylene oxides and aliphatic haloepoxides which can be employed for this purpose are found, for example, vicinal epoxides such as ethylene oxide, 1,2-epoxypropane, 1,2-epoxybutane, 2,3-epoxybutane, 2-methyl-1,2-epoxypropane, the epoxypentanes, the epoxyhexanes, the epoxyheptanes, the epoxyoctanes, 3-chloro-1,2-epoxypropane, 3-bromo-1,2-epoxypropane, 3-chloro-1,2-epoxybutane, 3,4-dichloro-1,2-epoxybutane, 4-chloro-1,2-epoxypentane, 3,4-dichloro-1,2-epoxyhexane, the chloroepoxyheptanes, the chloroepoxyoctanes, and the like. Preferred are the alkylene oxides having from 2 to 4 carbon atoms and the aliphatic haloepoxides having from 3 to 4 carbon atoms, such as ethylene oxide, propylene oxide, the butylene oxides, 3-chloro-1,2-epoxypropane, the chloroepoxybutanes, and the like.

The formulation for producing the heat sealable polyurethane foams of the invention can also include a hydroxyl-containing natural oil having a molecular weight of less than about 1500, such as castor oil and the like.

In the preparation of the heat sealable polyurethane foams employed in the invention, an organic polyisocyanate is reacted with a mixture of hydroxyl-containing compositions wherein said mixture comprises a major amount of a polyoxyalkylene polyol having an average molecular weight of greater than about 2000 and a minor amount of a polyol having an average molecular weight of less than about 1500, the last said polyol having been fully described hereinabove. The preferred proportion of the components of the said mixture is from about 80 to 99 weight percent, and most preferably from 90 to 98 weight percent, based on weight of said mixture, of the polyoxyalkylene polyol having an average molecular weight of greater than about 2000, and from about 1 to 20 weight percent, and most preferably from 2 to 10 weight percent, based on weight of said mixture, of the polyol having an average molecular weight of less than about 1500. The amount of organic polyisocyanate employed is dependent, in part, upon such factors as the density of the foam and the amount of cross linking desired. In general, however, the total isocyanate equivalent to total reactive hydrogen equivalent is ordinarily such as to provide a ratio of about 0.8 to 1.2 equivalents of isocyanate per equivalent of reactive hydrogen (as determined by the Zerewitinoff method, e.g., the hydrogen in water and in hydroxyl groups), and preferably a ratio of about 0.9 to 1.1 equivalents of isocyanate per equivalent of reactive hydrogen.

The foaming can be by the one-shot, semiprepolymer, or prepolymer technique, all of which are known in the art. The foaming operation can be effected by the use of blowing agents or by employing a small amount of water in the reaction mixture (for example, from about 1 to 5 weight percent of water, based on total weight of the reaction mixture), or both, both methods being known in the art. The preferred blowing agents are the liquified fluorocarbon gases which have boiling points between about −60° F. and 80° F. The liquidified gases are saturated aliphatic hydrocarbons which vaporize at or below the temperature of the foaming mass. Such gases are at least partially fluorinated and may also be otherwise halogenated.

Preferred blowing agents are the fluorocarbons such as trichloromonofluoromethane; dichlorodifluoromethane, dichlorofluoromethane; 1,1-dichloro-1-fluoroethane; 1,1-difluoro-1,2,2-trichloroethane; and 2-chloro-1,1,1,2,3,3,4,4,4-nonafluorobutane. The amount of blowing agent used will vary with the density desired in the foamed product. In general it may be stated that for 100 grams of resin mix containing an average NCO/OH ratio of about 1 to 1, about 0.005 to 0.3 mole of gas are used to provide densities ranging from 30 to 1 lbs. per cubic foot. If desired, water may be used in conjunction with the blowing agent.

Catalysts can be employed in the reaction mixture for accelerating the isocyanate-hydroxyl reaction. Examples include a wide variety of organic tin catalysts, tertiary amine catalysts, and combinations thereof.

Among the organic tin compounds that deserve particular mention are stannous acylates such as stannous acetate, stannous octoate, stannous laurate, stannous oleate, etc.; stannous alkoxides such as stannous butoxide, stannous 2-ethylhexoxide, stannous phenoxide, o, m and p-stannous cresoxides, etc.; dialkyl tin salts of carboxylic acids, e.g., dibutyltin diacetate, dibutyltin dilaurate, dibutyltin maleate, dilauryltin diacetate, dioctyltin diacetate, and the like. Similarly there may be used a trialkyltin hydroxide, dialkyltin oxide or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin dichloride, dioctyltin dichloride, and the like.

Typical tertiary amine catalysts which can be employed include trimethylamine, N-methylmorpholine, N-ethylmorpholine, triethylenediamine, N,N,N',N'-tetramethyl-1,3-butanediamine, triethanolamine, and the like. The tertiary amines may be used as primary catalysts for accelerating the hydroxyl isocyanate reaction or as a secondary catalyst in combination with the above noted organic tin compounds. The catalysts are employed in small amounts, for example, from about 0.001 percent to about 5 percent, based on weight of the reaction mixture.

It is also within the scope of the invention to employ small amounts, e.g., about 0.001% to 5.0% by weight, based on the total reaction mixture, of an emulsifying agent such as a siloxaneoxyalkylene block copolymer having from about 10 to 80 percent by weight of siloxane polymer and from 90 to 20 percent by weight of alkylene oxide polymer, such as the copolymers described in U.S. Patent 2,834,748. Although the use of an emulsifier is desirable to influence the type of foam structure that is formed, the foam products of the invention can be prepared without emulsifiers.

The laminated structures of the invention have at least one layer comprising a flexible polyurethane foam of the type described herein that has been heat sealed to a substrate. The substrate can be any of a variety of solids, such as a fabric, a thermoplastic, a polyurethane foam, or the like. Specific examples of the substrates contemplated include, for instance, the thermoplastic organic plastics, for example, poly(vinyl chloride) and vinyl chloride copolymers, polyethylene, polypropylene, polystyrene, and the like; fabrics, which includes spun, woven, knitted, felted, matted, and the like, textile fabrics produced from natural and synthetic fibers such as cotton, wool, silk, linen, jute, hemp, sisal, nylon, Orlon, Dacron, rayon, polyurethanes, and the like; flexible and rigid polyurethane foams; and the like. Fabrics are the preferred substrates.

The laminated structures of the invention are prepared by heating part or all of the surface of the heat sealable polyurethane foam described herein to a temperature above the fusion temperature of the foam to form a layer of liquid, and thereafter or concurrently with the heating operation, applying the substrate to the fused surface and holding in contact therewith while cooling until the fused surface cools and resolidifies, thereby forming an adhesive bond between the foam and the substrate. The fusion temperature of the foam will vary depending upon the nature and proportion of the components therein, but in general is in the range of from about 400° F. to about 600° F. It is in general desirable not to heat the surface of the foam to a temperature higher than about 100° F. above the fusion temperature of the particular foam. In keeping the substrate in contact with the fused surface of the foam until said surface has cooled and resolidified, it is desirable to employ a moderate amount of pressure in order to maintain the foam and substrate in contact. The pressure can be as low as that resulting from the weight of the foam or the substrate, but is preferably of the order of from about 0.1 to about 100 or more pounds per square inch.

The heat can be applied to the surface of the foam by any convenient means, for example, a flame, dielectric heating, a hot surface such as a "hot plate," infra-red heating, and the like.

The laminated structures of the invention are widely useful compositions. For example, foam/fabric laminates can be employed in clothing wherein the foam acts as padding and/or insulating material. Blocks of foam can be heat sealed to each other ("butt-welded") to form larger blocks for use in applications where the readily available foams are not large enough. Foam can be laminated to plastic films to form articles useful as padding, insulation, and the like.

The non-limiting examples which follow illustrate various aspects of the invention. In the examples, all parts are by weight unless otherwise indicated. The tolylene diisocyanate employed to prepare the foams was an 80–20 parts by weight mixture of 2,4- and 2,6- tolylene diisocyanate, TMBDA refers to N,N,N′,N′-tetramethyl-1,3-butanediamine, and surfactant L–520 is a polysiloxane-polyoxyalkylene block copolymer produced in accordance with the method disclosed in U.S. Patent No. 2,834,-748, and is marketed by Union Carbide Corporation.

EXAMPLE 1

A polyurethane foam was prepared by the "one-shot" technique from the following formulation.

| Ingredient: | Parts by weight |
|---|---|
| Polyoxyalkylene polyol A [1] | 90 |
| Polyoxyalkylene polyol B [2] | 10 |
| TMBDA | 0.15 |
| Stannous octoate | 0.15 |
| Surfactant L–520 | 2.0 |
| N-ethyl morpholine | 0.2 |
| Water | 2.5 |
| Tolylene diisocyanate | 35 |

[1] A polyoxypropylene polyol having an average molecular weight of about 3200 and a hydroxyl number of 52.
[2] The ethylene oxide adduct of glycerine having a molecular weight of about 1000 and a hydroxyl number of 170.

A piece of the above-identified foam 5 inches long and 1½ inches wide was pressed against a piece of untreated cotton cloth that was resting on a hot plate that was heated to a temperature of 482° F. (determined by a pyrometer). The foam was pressed against the cloth by a 12-pound weight, and the pressure was applied for 15 seconds. At the end of the 15-second period, the laminated article was removed from the hot plate and allowed to cool to room temperature. The resulting bond between the cloth and foam was tested manually and found to be good.

EXAMPLE 2

A polyurethane foam was prepared by the "one-shot" technique from the following formulation.

| Ingredient: | Parts by weight |
|---|---|
| Polyoxyalkylene polyol A [1] | 95 |
| Polyoxyalkylene polyol C [2] | 5 |
| Stannous octoate | 0.2 |
| TMBDA | 0.1 |
| N-ethyl morpholine | 0.2 |
| Water | 1.95 |
| Surfactant L–520 | 2.0 |
| Tolylene diisocyanate | 29.2 |

[1] A polyoxypropylene polyol having an average molecular weight of about 3200 and a hydroxyl number of 52.
[2] The propylene oxide adduct of glycerine having a molecular weight of about 1000 and a hydroxyl number of 168.

The above-treated foam was heat sealed to untreated cotton cloth by a procedure analogous to that described in Example 1. The bond between the cloth and the foam was tested manually and found to be very good.

EXAMPLES 3 AND 4

Two polyurethane foams were prepared by the "one-shot" method from the following formulations:

| Ingredient | Parts by weight | |
|---|---|---|
| | Example 3 | Example 4 |
| Polyoxyalkylene polyol D [1] | 90 | 90 |
| Polyoxyalkylene polyol B [2] | 10 | 10 |
| Water | 2.5 | 2.5 |
| TMBDA | 0.1 | 0.1 |
| Surfactant L–520 | 1.0 | 1.0 |
| Stannous octoate | 0.2 | 0.2 |
| N-ethyl morpholine | 0.1 | 0.1 |
| Polyoxyalkylene polyol D [1] | 0.8 | 0.8 |
| Trichloromonofluoromethane | | 10 |
| Surfactant L–520 | | 0.83 |
| Tolylene diisocyanate | 35.6 | 25.6 |

[1] The propylene oxide adduct of glycerine having an average molecular weight of about 3000 and a hydroxyl number of 56.
[2] The ethylene oxide adduct of glycerine having an average molecular weight of about 1000 and a hydroxyl number of 170.

Samples of each of the above-identified foams measuring 5 inches x 1½ inches x ¼ inch were heat sealed to pieces of cotton knit undershirt cloth by placing the cloth on top of a hot plate and then placing the foam on top of the cloth. The foam and cloth were left on the hot plate for 15 seconds under a 12-pound weight. After the heat sealing operation the laminated articles were placed on a large metal surface in order to conduct away the heat absorbed during the heat sealing operation. After waiting for one day, the laminated articles were tested in an Instron tester to determine the peel strength or adhesive bond strength between the foam and the cloth. The results of this evaluation are displayed in Table I.

*Table I*

| Example | Hot plate temp., °F. | Peel strength, pounds/inch of width |
|---|---|---|
| 3 | 482 | 0.20 |
| 3 | 572 | 0.79 |
| 4 | 482 | 0.10 |
| 4 | 572 | 0.53 |

EXAMPLES 5, 6, AND 7

Three polyurethane foams were prepared by the "one-shot" technique from the following formulations (in each case, tolylene diisocyanate was employed in an amount of 3 weight percent excess over the stoichiometric amount):

| Ingredient | Parts by weight | | |
|---|---|---|---|
| | Example 5 | Example 6 | Example 7 |
| Polyoxyalkylene polyol D [1] | 95 | | |
| Polyoxyalkylene polyol E [2] | 5 | 10 | 10 |
| Polyoxyalkylene polyol A [3] | | 90 | 90 |
| Water | 2.0 | 3 | 3 |
| TMBDA | 0.1 | 0.1 | 0.1 |
| Surfactant L-520 | 1.0 | 1.0 | 1.0 |
| Stannous octoate | 0.3 | 0.25 | 0.25 |
| N-ethyl morpholine | 0.15 | 0.125 | 0.1 |

[1] The propylene oxide adduct of glycerine having an average molecular weight of about 3000 and a hydroxyl number of 56.
[2] The propylene oxide adduct of 1,2,6-trihydroxyhexane having an average molecular weight of about 750 and a hydroxyl number of 240.
[3] A polyoxypropylene polyol having an average molecular weight of about 3200 and a hydroxyl number of 52.

Samples of each foam were heat sealed to rayon tricot cloth in a commercial flame laminating machine. The resulting foam/cloth laminates had the following peel strengths, measured in pounds/1½ inches of width.

Example:
                                                            Peel strength, pounds/1½ inch of width
5 ---- 0.62
6 ---- 0.51
7 ---- 0.40

EXAMPLES 8–20

Table II, below, displays the formulations of 13 polyurethane foams which were prepared by the "one-shot" method.

*Table II*

FORMULATIONS OF POLYURETHANE FOAMS (EXAMPLES 8–20)

| Example Number | 8 | 9 | 10 | 11 | 12 | 13 | 14 | 15 | 16 | 17 | 18 | 19 | 20 |
|---|---|---|---|---|---|---|---|---|---|---|---|---|---|
| Ingredient, Parts by weight: | | | | | | | | | | | | | |
| Polyoxyalkylene polyol A [1] | 90 | 90 | 90 | 90 | 90 | 85 | 85 | 90 | 98 | 95 | | | |
| Polyoxyalkylene polyol E [2] | 10 | 10 | 10 | 10 | 10 | | | | | | | | |
| Polyoxyalkylene polyol F [3] | | | | | | 15 | 15 | | | | 10 | 10 | 10 |
| Polyoxyalkylene polyol G [4] | | | | | | | | 10 | | | | | |
| Polyoxyalkylene polyol H [5] | | | | | | | | | 2 | 5 | | | |
| Polyoxyalkylene polyol I [6] | | | | | | | | | | | 65 | 65 | 90 |
| Tris(dipropylene glycol)phosphite | | | | | | | | | | | 25 | 25 | |
| Water | 3.0 | 3.0 | 3.0 | 3.5 | 3.5 | 3.0 | 3.0 | 3.0 | 3.0 | 3.0 | 2.5 | 3.0 | 3.0 |
| TMBDA | 0.15 | 0.15 | 0.1 | 0.1 | | 0.15 | 0.15 | 0.15 | 0.15 | 0.15 | 0.15 | 0.15 | 0.15 |
| 1,4-diazobicyclo [2.2.2] octane | | | | | 0.1 | | | | | | | | |
| Surfactant L-520 | 1.2 | 1.2 | 1.5 | 1.5 | 1.5 | 1.5 | 1.5 | 1.5 | 1.5 | 1.5 | 1.2 | 1.5 | 1.5 |
| N-ethyl morpholine | | 0.1 | 0.1 | 0.125 | 0.125 | 0.125 | 0.125 | 0.125 | 0.125 | 0.125 | 0.125 | 0.125 | 0.125 |
| Stannous octoate | 0.2 | 0.2 | 0.2 | 0.25 | 0.3 | 0.25 | 0.25 | 0.25 | 0.3 | 0.25 | 0.25 | 0.25 | 0.25 |
| Tolylene diisocyanate,[7] percent | 3 | 3 | 3 | 3 | 3 | 3 | 3 | 3 | 3 | 3 | 3 | 3 | 3 |

[1] A polyoxypropylene polyol having an average molecular weight of about 3200 and a hydroxyl number of 52.
[2] The propylene oxide adduct of 1,2,6-trihydroxyhexane having an average molecular weight of about 750 and a hydroxyl number of 240.
[3] The propylene oxide adduct of 1,2,6-trihydroxyhexane having an average molecular weight of about 1500 and a hydroxyl number of 112.
[4] The propylene oxide adduct of glycerine having a molecular weight of about 1500 and a hydroxyl number of 112.
[5] The propylene oxide adduct of 1,2,6-trihydroxyhexane having an average molecular weight of about 4000 and a hydroxyl number of 42.
[6] Polypropylene glycol having an average molecular weight of about 2025 and a hydroxyl number of 56.
[7] The tolylene diisocyanate was employed in the indicated weight percent excess over the stoichiometric amount.

The above-described foams were heat sealed to muslin cloth on a commercial flame laminating machine. The treating conditions were:

Feed rate—80 feet/minute.
Nip roll pressure—30 pounds/linear inch.

The resulting foam/cloth laminates were evaluated by subjecting 1 inch x 6 inch test specimens to the following tests:

TEST METHODS (1) *Dry peel strength.*—The force in pounds per inch necessary to separate the foam from the cloth (tear strength, tested on an Instron tester).

(2) *Dry cleaning solvent, wet peel strength.*—Six test specimens are placed in a one-pint glass bottle containing the following solution.

Component:                                    Parts by weight
  R. R. Street and Co. Inc. Formula 886 soap ---- 3
  Tap water ---- 6
  Perchloroethylene ---- 91

The container is then mechanically shaken for ten minutes. The specimens are removed and rinsed in 100 percent perchloroethylene. The samples are then placed between paper towels to remove the excess liquid. The peel strength is then determined with three specimens while wet.

(3) *Dry cleaning solvent, dry peel strength.*—The other three specimens are dried at room temperature for 24 hours and the peel strength determined.

(4) *Soap solution, wet peel strength.*—Six test specimens are immersed in a 1-liter solution at 160° F. in a 2-liter container. The solution has the following composition: 1 percent by weight Ivory Flakes, and 99 percent by weight tap water.

The specimens are gently stirred for 10 minutes. The specimens are then removed and rinsed in lukewarm water. The specimens are then placed between paper towels to remove the excess liquid. Three specimens are run wet to determine the wet peel strength.

(5) *Soap solution, dry peel strength.*—Three of the above specimens are dried at room temperature for 24 hours and the peel strengths determined.

The results of these evaluation tests are displayed below in Table III, which also shows the reduction in thickness of the polyurethane foam resulting from the flame laminating operation. Table III also indicates, for comparison purposes, representative properties of a commercial polyester polyurethane foam/muslin cloth laminate.

polyol having an average molecular weight of from about 200 to about 1500, (b) a hydroxyaliphatic ester of a phosporus-containing acid, said ester having an average Table III

| Test | 8 | 9 | 10 | 11 | 12 | 13 | 14 | 15 | 16 | 17 | 18 | 19 | 20 | Polyester foam |
|---|---|---|---|---|---|---|---|---|---|---|---|---|---|---|
| Peel strength, pounds/inch of width | 0.64 | 0.55 | 0.69 | 0.76 | 0.81 | 0.70 | 0.65 | 0.76 | 0.61 | 0.83 | 0.80 | 0.80 | 0.70 | 0.58 |
| Peel strength after dry cleaning: | | | | | | | | | | | | | | |
| Wet, pounds | 0.22 | 0.26 | 0.24 | 0.42 | 0.30 | 0.30 | 0.27 | 0.24 | 0.30 | 0.44 | 0.28 | 0.30 | 0.22 | 0.26 |
| Dry, pounds | 0.60 | 0.70 | 0.64 | 0.80 | 0.84 | 0.705 | 0.72 | 0.81 | 0.83 | 0.71 | 0.84 | 0.77 | 0.66 | 0.83 |
| Peel strength after washing: | | | | | | | | | | | | | | |
| Wet, pounds | 0.30 | 0.27 | 0.38 | 0.16 | 0.28 | 0.16 | 0.22 | 0.16 | 0.34 | 0.40 | 0.24 | 0.29 | 0.16 | 0.20 |
| Dry, pounds | 0.56 | 0.60 | 0.59 | 0.49 | 0.64 | 0.46 | 0.52 | 0.51 | 0.77 | 0.76 | 0.63 | 0.64 | 0.45 | 0.63 |
| Reductions in thickness during flame laminating, inches | 0.018 | 0.022 | 0.017 | | 0.025 | 0.022 | 0.019 | 0.020 | 0.026 | 0.022 | 0.019 | 0.020 | 0.025 | 0.045 |

EXAMPLE 21

A polyurethane foam was prepared by the "one-shot" technique from the following formulation:

| | Parts by weight |
|---|---|
| Polyoxyalkylene polyol A [1] | 95 |
| Tris(dipropylene glycol)phosphite | 5 |
| Water | 3 |
| 1,4-diazabicyclo [2.2.2]octane | 0.10 |
| Surfactant L–520 | 1.4 |
| N-ethylmorpholine | 0.2 |
| Polyoxyalkylene polyol I [2] | 0.7 |
| Stannous octoate | 0.15 |
| Tolylene diisocyanate _____percent | 3 [3] |

[1] A polyoxypropylene polyol having an average molecular weight of about 3200 and a hydroxyl number of 52.
[2] Polyoxypropylene glycol having an average molecular weight of about 2025 and a hydroxyl number of 56.
[3] Excess.

The above-identified polyurethane foam was heat sealed to polyethylene film on a commercial flame laminating machine. The resulting laminate had a peel strength of 0.9 pound/inch of width.

In this example, and in Examples 5–20, wherein the various samples of polyurethane foam were laminated on a commercial flame laminating machine, the sheets of foam were heat sealed to each other ("butt welded") in order to make one continuous sheet of polyurethane foam for the feed to the machine.

EXAMPLE 22

The polyurethane foam described in Example 21 is heat sealed to polyvinyl chloride and vinyl chloride copolymer films by a procedure analogous to that described in Example 21.

EXAMPLE 23

Laminates are prepared with cotton fabric and with a polyurethane foam having the same formulation as that described in Example 21, except that the tris(dipropylene glycol)phosphite is replaced with the propylene oxide adduct of orthophosphoric acid having an average molecular weight of about 450, or with the propylene oxide adduct of orthophosphorous acid having an average molecular weight of about 450. The laminates are prepared by a procedure analogous to that described in Example 1.

What is claimed is:

1. A laminated structure which comprises at least one layer of a flexible polyurethane foam heat sealed to a fabric substrate, wherein said flexible polyurethane foam consists essentially of the foamed reaction product of (1) an organic polyisocyanate, and (2) a mixture of a major amount, based on weight of said mixture, of a polyoxyalkylene polyol having an average molecular weight of from about 2000 to about 10,000, and a minor amount, based on weight of said mixture, of polyol selected from the group consisting of (a) a polyoxyalkylene polyol having an average molecular weight of from about 200 to about 1500, (b) a hydroxyaliphatic ester of a phosporus-containing acid, said ester having an average molecular weight of from about 200 to about 1500, wherein said ester is represented by the structural formula:

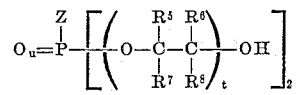

wherein $u$ is an integer having a value of from 0 to 1, wherein $R^5$, $R^6$, $R^7$, and $R^8$ individually represent a radical selected from the group consisting of hydrogen, alkyl having from 1 to 6 carbon atoms, and haloalkyl having from 1 to 6 carbon atoms, wherein $t$ is a number having a value of at least 1 and is such that the average molecular weight of the said ester is from about 200 to about 1500, and wherein Z is a radical selected from the group consisting of hydrogen and a radical having the formula

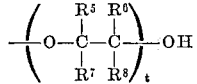

wherein the variables $R^5$, $R^6$, $R^7$, $R^8$, and $t$ have the significance stated above, provided that when Z is hydrogen $u$ is 1, and (c) castor oil.

2. A laminated structure which comprises at least one layer of a flexible polyurethane foam heat sealed to a fabric substrate, wherein said flexible polyurethane foam consists essentially of the foamed reaction product of (1) an organic polyisocyanate, and (2) a mixture of from about 80 to about 99 weight percent, based on weight of said mixture, of a polyoxyalkylene polyol having an average molecular weight of from about 2000 to about 10,000, and from about 1 to about 20 weight percent, based on weight of said mixture, of a polyoxyalkylene polyol having an average molecular weight of from about 200 to about 1500.

3. A laminated structure which comprises at least one layer of a flexible polyurethane foam heat sealed to a fabric substrate, wherein said flexible polyurethane foam consists essentially of the foamed reaction product of (1) an organic polyisocyanate, and (2) a mixture of from about 80 to about 99 weight percent, based on weight of said mixture, of a polyoxyalkylene polyol having an average molecular weight of from about 2000 to about 10,000, and from about 1 to about 20 weight percent, based on weight of said mixture, of a hydroxyaliphatic ester of a phosphorus-containing acid, said ester having an average molecular weight of from about 200 to about 1500, wherein said ester is represented by the formula

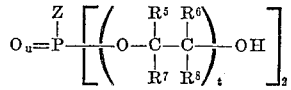

wherein $u$ is an integer having a value of from 0 to 1, wherein $R^5$, $R^6$, $R^7$, and $R^8$ individually represent a radical selected from the group consisting of hydrogen, alkyl having from 1 to 6 carbon atoms, and haloalkyl having from 1 to 6 carbon atoms, wherein $t$ is a number having a value of at least 1 and is such that the average molecular weight of the said ester is from about 200 to about 1500, and wherein Z is a radical selected from the group consisting of hydrogen and a radical having the formula

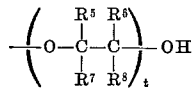

wherein the variables $R^5$, $R^6$, $R^7$, $R^8$, and $t$ have the significance stated above, provided that when Z is hydrogen $u$ is 1.

4. A laminated structure which comprises at least one layer of a flexible polyurethane foam heat sealed to a fabric substrate, wherein said flexible polyurethane foam consists essentially of the reaction product of (1) an organic polyisocyanate, and (2) a mixture of (a) from about 80 to about 99 weight percent, based on weight of said mixture, of a polyoxyalkylene polyol having an average molecular weight of from about 2000 to about 10,000, said polyoxyalkylene polyol being the reaction product of an epoxyalkane having from 2 to 4 carbon atoms and a composition selected from the group consisting of water and an alkanepolyol having from 2 to 3 hydroxyl groups and from 2 to 6 carbon atoms, and (b) from about 1 to about 20 weight percent, based on weight of said mixture, of a polyoxyalkylene polyol having an average molecular weight of from about 200 to about 1500, wherein the last said polyoxyalkylene polyol comprises the reaction product of an epoxyalkane having from 2 to 4 carbon atoms and a composition selected from the group consisting of water and an alkanepolyol having from 2 to 3 hydroxyl groups and from 2 to 6 carbon atoms.

5. A laminated structure which comprises at least one layer of a flexible polyurethane foam heat sealed to a fabric substrate, wherein said flexible polyurethane foam consists essentially of the reaction product of (1) an organic polyisocyanate, and (2) a mixture of (a) from about 80 to about 99 weight percent, based on weight of said mixture, of a polyoxyalkylene polyol having an average molecular weight of from about 2000 to about 10,000, said polyoxyalkylene polyol being the reaction product of an epoxyalkane having from 2 to 4 carbon atoms and a composition selected from the group consisting of water and an alkanepolyol having from 2 to 3 hydroxyl groups and from 2 to 6 carbon atoms, and (b) from about 1 to about 20 weight percent, based on weight of said mixture, of a hydroxyaliphatic phosphite having an average molecular weight of from about 200 to about 1500, said hydroxyaliphatic phosphite being represented by the formula

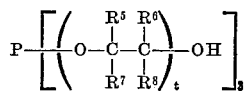

wherein the variables $R^5$, $R^6$, $R^7$, and $R^8$, individually represent radicals selected from the group consisting of hydrogen, alkyl having from 1 to 6 carbon atoms, and haloalkyl having from 1 to 6 carbon atoms, and wherein $t$ represents a number having a value of at least 1 and is such that the average molecular weight of said hydroxyaliphatic phosphite is from about 200 to about 1500.

6. A laminated structure which comprises at least one layer of a flexible polyurethane foam heat sealed to a fabric substrate, wherein said flexible polyurethane foam consists essentially of the foamed reaction product of (1) tolylene diisocyanate, and (2) a mixture of (a) from about 80 to about 99 weight percent, based on the weight of said mixture, of a polyoxyalkylene polyol having an average molecular weight of from about 2000 to about 10,000, wherein said polyoxyalkylene polyol comprises the reaction product of an epoxyalkane having from 2 to 4 carbon atoms and a composition selected from the group consisting of water and the alkanepolyols having from 2 to 3 hydroxyl groups and from 2 to 6 carbon atoms, and (b) from about 1 to about 20 weight percent, based upon weight of said mixture, of tris(dialkylene glycol) phosphite wherein the alkylene groups thereof have from 2 to 4 carbon atoms.

7. The laminated structure of claim 6 wherein said tris(dialkylene glycol) phosphite is tris(dipropylene glycol) phosphite.

8. The laminated structure of claim 7 wherein said fabric substrate is a cotton cloth.

References Cited by the Examiner

UNITED STATES PATENTS

| | | | |
|---|---|---|---|
| 2,642,920 | 6/53 | Simon et al. | 156—78 |
| 2,788,335 | 4/57 | Barthel. | |
| 2,874,389 | 2/59 | Koenigsberg. | |
| 2,929,800 | 3/60 | Hill. | |
| 2,955,091 | 10/60 | Kane. | |
| 2,957,793 | 10/60 | Dickey. | |
| 2,957,832 | 10/60 | Gmitter et al. | |
| 2,977,330 | 3/61 | Brower. | |
| 2,990,379 | 6/61 | Young et al. | |
| 3,057,766 | 10/62 | Dickey | 156—497 X |

FOREIGN PATENTS

| | | |
|---|---|---|
| 787,592 | 12/57 | Great Britain. |
| 863,224 | 3/61 | Great Britain. |

OTHER REFERENCES

Polyether Alcohol Phosphites, WC–2, Weston Chemical Corporation, 96 Roanoke Avenue, Newark 5, New Jersey, 7 pp., March 1961.

"Urethane Plastics—Polymers of Tomorrow," Industrial and Engineering Chemistry, vol. 48, No. 9, September 1956, pp. 1383–1391.

EARL M. BERGERT, *Primary Examiner.*